(12) United States Patent
Haller et al.

(10) Patent No.: US 9,809,136 B2
(45) Date of Patent: *Nov. 7, 2017

(54) DEVICE FOR DAMPING AN UPPER SUSPENSION PART IN AT LEAST ONE SPATIAL DIRECTION WITH RESPECT TO A LOWER SUSPENSION PART MOVABLE RELATIVE THERETO

(71) Applicant: GRAMMER AG, Amberg (DE)

(72) Inventors: Erwin Haller, Birgland (DE); Jens Kolb, Koenigstein (DE)

(73) Assignee: Grammer AG, Amberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,744

(22) Filed: Feb. 5, 2015

(65) Prior Publication Data

US 2015/0232005 A1     Aug. 20, 2015

(30) Foreign Application Priority Data

Feb. 14, 2014   (DE) .......................... 10 2014 001 890

(51) Int. Cl.
*B60N 2/50* (2006.01)
*B60N 2/02* (2006.01)
(Continued)

(52) U.S. Cl.
CPC ........... *B60N 2/501* (2013.01); *B60N 2/0224* (2013.01); *B60N 2/0232* (2013.01);
(Continued)

(58) Field of Classification Search
CPC ........ B60N 2/508; B60N 2/505; B60N 2/502; B60N 2/522; B60N 2/162; B60N 2/164; B60N 2/501; B60N 2/525
See application file for complete search history.

(56) References Cited

U.S. PATENT DOCUMENTS 3,144,270 A   8/1964   Bilancia
3,163,466 A   12/1964   Radke et al.
(Continued)

FOREIGN PATENT DOCUMENTS

CN   104842825   8/2015
DE   6811419   8/1969
(Continued)

OTHER PUBLICATIONS

Extended Search Report for European Patent Application No. 14194426.4, dated Oct. 9, 2015, 3 pages.
(Continued)

*Primary Examiner* — Eret McNichols
(74) *Attorney, Agent, or Firm* — Sheridan Ross P.C.

(57) ABSTRACT

The invention relates to a device for damping an upper suspension part in at least one spatial direction (X, Y, Z) with respect to a lower suspension part movable relative thereto, wherein a spring apparatus which acts between the upper suspension part and the lower suspension part is provided for damping, wherein an actuating element is provided by way of which a force can be introduced into the device bidirectionally in the operating direction of the spring apparatus, wherein the actuating element is actuable via a control apparatus.

23 Claims, 6 Drawing Sheets

(51) Int. Cl.
*B60N 2/16* (2006.01)
*B60N 2/52* (2006.01)

(52) U.S. Cl.
CPC .......... *B60N 2/0244* (2013.01); *B60N 2/162* (2013.01); *B60N 2/164* (2013.01); *B60N 2/502* (2013.01); *B60N 2/505* (2013.01); *B60N 2/508* (2013.01); *B60N 2/525* (2013.01); *B60N 2/522* (2013.01); *B60N 2002/0236* (2013.01)

(56) References Cited

U.S. PATENT DOCUMENTS

| | | | |
|---|---|---|---|
| 3,874,626 A | 4/1975 | Gross et al. | |
| 3,888,451 A | 6/1975 | Lacey | |
| 4,461,444 A | 7/1984 | Grassl et al. | |
| 4,611,783 A | 9/1986 | Sakamoto | |
| 4,638,982 A | 1/1987 | Misher et al. | |
| 4,640,488 A | 2/1987 | Sakamoto | |
| 4,685,731 A | 8/1987 | Migut | |
| 4,885,918 A | 12/1989 | Vaccaro | |
| 4,941,641 A * | 7/1990 | Granzow | B60N 2/501 248/161 |
| 5,169,112 A * | 12/1992 | Boyles | B60N 2/501 248/406.2 |
| 5,176,355 A | 1/1993 | Carter | |
| 5,251,864 A | 10/1993 | Itou | |
| 5,273,275 A | 12/1993 | Wilkerson | |
| 5,364,060 A | 11/1994 | Donovan et al. | |
| 5,642,916 A | 7/1997 | Dybro et al. | |
| 5,954,400 A | 9/1999 | Brodersen | |
| 5,957,426 A | 9/1999 | Brodersen | |
| 5,975,508 A * | 11/1999 | Beard | B60N 2/501 180/89.12 |
| 6,264,163 B1 | 7/2001 | Ivarsson | |
| 6,705,238 B1 * | 3/2004 | Heckert | B66F 7/065 108/145 |
| 7,568,675 B2 * | 8/2009 | Catton | B60N 2/502 248/421 |
| 7,637,360 B2 * | 12/2009 | Carlson | A47C 1/03 188/267.2 |
| 7,770,974 B2 * | 8/2010 | Ott | B60N 2/501 297/344.15 |
| 7,810,884 B2 * | 10/2010 | Lorey | B60N 2/501 297/344.16 |
| 7,975,813 B2 * | 7/2011 | Spangler | B60N 2/38 188/267 |
| 8,342,541 B2 | 1/2013 | Wurmthaler et al. | |
| 8,585,004 B1 | 11/2013 | Roeglin | |
| 8,931,750 B2 | 1/2015 | Kohl et al. | |
| 9,266,453 B2 * | 2/2016 | Haller | B60N 2/527 |
| 2003/0075401 A1 * | 4/2003 | Carlson | B62D 5/006 188/267 |
| 2004/0090100 A1 | 5/2004 | Igarashi | |
| 2004/0159763 A1 | 8/2004 | Mullinix et al. | |
| 2006/0237885 A1 * | 10/2006 | Paillard | B60N 2/501 267/140.15 |
| 2008/0015753 A1 | 1/2008 | Wereley et al. | |
| 2008/0042480 A1 | 2/2008 | Volkman et al. | |
| 2009/0134595 A1 | 5/2009 | Haller et al. | |
| 2010/0102493 A1 | 4/2010 | Deml et al. | |
| 2010/0122881 A1 * | 5/2010 | Carlson | A47C 1/03 188/267 |
| 2010/0133413 A1 | 6/2010 | Wahls et al. | |
| 2010/0224343 A1 | 9/2010 | Fukuma | |
| 2010/0332079 A1 | 12/2010 | Wang et al. | |
| 2011/0001342 A1 | 1/2011 | Deml et al. | |
| 2011/0024958 A1 | 2/2011 | Deml et al. | |
| 2012/0001467 A1 | 1/2012 | Teufel et al. | |
| 2012/0001468 A1 | 1/2012 | Schuler et al. | |
| 2012/0090930 A1 | 4/2012 | Haller | |
| 2012/0097822 A1 | 4/2012 | Hammarskiold | |
| 2013/0153320 A1 * | 6/2013 | Contratto | B60N 2/501 180/89.1 |
| 2013/0158791 A1 | 6/2013 | Contratto et al. | |
| 2013/0168624 A1 | 7/2013 | Shin | |
| 2013/0206949 A1 | 8/2013 | Archambault | |
| 2013/0264455 A1 * | 10/2013 | Robbins | F16F 15/022 248/564 |
| 2015/0021965 A1 | 1/2015 | Ellerich et al. | |
| 2015/0158404 A1 * | 6/2015 | Pylypenko | B60N 2/525 248/575 |
| 2016/0200230 A1 | 7/2016 | Haller | |
| 2016/0214658 A1 | 7/2016 | Haller | |

FOREIGN PATENT DOCUMENTS

| | | | |
|---|---|---|---|
| DE | 7115795 | 7/1971 | |
| DE | 2446515 | 4/1976 | |
| DE | 2704921 | 8/1978 | |
| DE | 2707184 | 8/1978 | |
| DE | 7835259 | 5/1979 | |
| DE | 2849700 | 5/1980 | |
| DE | 3227858 | 1/1984 | |
| DE | 3242287 | 5/1984 | |
| DE | 3517505 | 11/1986 | |
| DE | WO 8809270 A1 * | 12/1988 | ............ B60N 2/501 |
| DE | 4025183 | 11/1991 | |
| DE | 4335199 | 5/1995 | |
| DE | 10354635 | 6/2005 | |
| DE | 102006017774 | 10/2007 | |
| DE | 102010026015 | 1/2012 | |
| EP | 0002332 | 8/1981 | |
| FR | 2208353 | 6/1974 | |
| FR | 2286022 | 4/1976 | |
| JP | 2009-228723 | 10/2009 | |

OTHER PUBLICATIONS

Extended Search Report for European Patent Application No. 14194425.6, dated Oct. 9, 2015, 3 pages.
Official Action for U.S. Appl. No. 14/609,618, dated Nov. 17, 2015 20 pages.
U.S. Appl. No. 14/609,618, dated Jan. 30, 2015, Haller et al.
Official Action for German Patent Application No. 102014002210.2, dated Jan. 7, 2015, 5 pages.
Official Action for German Patent Application No. 102014001890.3, dated Jun. 30, 2014, 6 pages.
Official Action for U.S. Appl. No. 12/826,232, dated Sep. 20, 2012, 12 pages.
Final Action for U.S. Appl. No. 12/826,232, dated Mar. 13, 2013, 12 pages.
Official Action for U.S. Appl. No. 12/826,232, dated Jun. 26, 2013, 7 pages.
Final Action for U.S. Appl. No. 12/826,232, dated Dec. 27, 2013, 11 pages.
Official Action for U.S. Appl. No. 12/826,232, dated Jun. 20, 2014, 6 pages.
Notice of Allowance for U.S. Appl. No. 12/826,232, dated Aug. 29, 2014, 7 pages.
Official Action for U.S. Appl. No. 14/609,618, dated May 13, 2016 17 pages.
Official Action (no translation) for Chinese Patent Apllication No. 201410805836.9, dated Jan. 3, 2017, 7 pages.
Advisory Action for U.S. Appl. No. 14/609,618, dated Aug. 12, 2016 4 pages.
Official Action for U.S. Appl. No. 14/609,618, dated Sep. 12, 2016 16 pages.
Official Action with English Translation for China Patent Application No. 201410802933.2, dated Jun. 16, 2017, 19 pages.
Official Action for German Patent Application No. 102014001890.3, dated Jun. 27, 2017, 3 pages.
Notice of Allowance for U.S. Appl. No. 14/609,618, dated Apr. 10, 2017 17 pages.

* cited by examiner

DEVICE FOR DAMPING AN UPPER SUSPENSION PART IN AT LEAST ONE SPATIAL DIRECTION WITH RESPECT TO A LOWER SUSPENSION PART MOVABLE RELATIVE THERETO

CROSS-REFERENCE TO RELATED APPLICATIONS

This application claims the benefit of German Application No. 10 2014 001 890.3 filed Feb. 14, 2014, the contents of which are incorporated herein by reference.

FIELD

The invention relates to a device for damping an upper suspension part in at least one spatial direction with respect to a lower suspension part movable relative thereto.

BACKGROUND

Devices of this type are often used to damp vehicle seats during operation of a vehicle. In this respect, the upper suspension part is connected to the seat surface of the vehicle seat, whilst the lower suspension part is arranged fixed in place on the vehicle or the body thereof, respectively.

However, in devices of this type for damping an upper suspension part with respect to a lower suspension part, it is problematic that during the operation of the device, in particular in a vehicle seat, temporary deviations from a pre-set distance between the lower and upper suspension face occur as a result of forces introduced into the device.

SUMMARY

An object of the invention is therefore to further develop a device of the aforementioned type in such a way that deviations of this type during the operation of the device are minimised.

This object is achieved by a device having all of the features of claim 1. Advantageous configurations of the invention may be found in dependent claims 2 to 9. This object is further achieved by a seat having all of the features of claim 10 and a vehicle having all of the features of claim 11.

The device according to the invention for damping an upper suspension part in at least one spatial direction with respect to a lower suspension part movable relative thereto, in which a spring apparatus which acts between the upper suspension part and the lower suspension part is provided for damping, therefore comprises an actuating element by way of which a force can be introduced into the device bidirectionally in the operating direction of the spring apparatus, this actuating element being actuable via a control apparatus. In a vehicle seat, a force of this type which can be introduced bidirectionally will generally be introducible in a positive and negative Z direction or vehicle vertical direction. However, it is also conceivable, in particular if this device is used in a vehicle seat, alternatively or additionally to introduce bidirectional forces both in the positive and negative X or longitudinal direction, respectively, and in the positive and negative Y or width direction, respectively.

As a result of the configuration according to the invention of the device, it is now possible to control the device actively, bidirectionally in the operating direction of the spring apparatus, via the actuating element, in such a way that the actuating element on the one hand brings about levelling in the event of temporary deviations in the distance between the lower and upper suspension face and on the other hand brings about an active engagement in isolating oscillations.

According to a first advantageous configuration of the invention, for this purpose the actuating element also comprises a drive, preferably configured as a rotary field magnet, and a coupling rod, drivable by the drive and preferably in the form of a recirculating ball screw. As a result of the drive and the coupling rod coupled thereto, it is now possible actively to counter suspension movements which occur during the operation of the device. In particular the configuration of the drive as a rotary field magnet, also known as a torque motor, is particularly advantageous, since a rotary field magnet of this type can also produce a standstill torque in long-term operation.

In this respect, it has been found to be advantageous to select the thread pitch of the recirculating ball screw in such a way that the drive of the lead screw can be produced by both the drive in the form of a rotary field magnet and the spring apparatus. In this case, there is never any self-locking by way of the pitch of the recirculating ball screw.

In accordance with a further inventive idea, the spring apparatus comprises a spring, which is arranged between the upper suspension part and the lower suspension part which is preferably in the form of an air spring, and a scissor-type support apparatus, which connects the upper suspension part to the lower suspension part such that they are movable relative to one another. A configuration of this type of the device according to the invention is particularly suitable for an application as suspension for a seat, in particular for a vehicle seat. The device according to the invention can thus be arranged between the seat surface and the vehicle body in a simple and compact manner, in such a way that it does not require any additional space.

It has been found to be advantageous for the scissor-type support apparatus to comprise a first scissors, consisting of a first inner link and a first outer link, and a second scissors, consisting of a second inner link and a second outer link, which are preferably interconnected via at least one floating bearing connection. As a result of this configuration of the invention, it is possible to configure the device particularly stably in the operating direction of the spring, in such a way that even tilting movements of the upper suspension face with respect to the lower suspension face are effectively prevented as a result.

In this respect, the drive may be fixedly arranged on the upper suspension part or lower suspension part, respectively, and the coupling rod on a floating bearing connection. However, it is also conceivable for the coupling rod to be fixedly arranged on the upper suspension part or lower suspension part, respectively while the drive acts on a floating bearing connection.

In accordance with a particularly advantageous inventive idea, the coupling rod is formed in a spring-loaded manner with at least one spring element. As a result of this configuration of the invention, when a force is introduced into the device according to the invention, the at least one spring element of the coupling rod is initially biased and the drive is only subsequently activated. As a result of this coupling of the drive to a coupling rod which is configured with at least one spring, permanent entrainment of the drive in rotation can be prevented, in particular in the high-frequency or short-stroke operating range, respectively of the device according to the invention. As a result of the superposition of different provided spring characteristics—on the one hand the spring of the spring apparatus and on the other hand this at least one spring element of the coupling rod—a wide spectrum for the introduction frequencies to be isolated is achieved. In this respect, the usable field of forces consists of the spring rate of the spring means and the spring rate of the at least one spring element, serving as a decoupling spring, of the coupling rod as well as of the force spectrum of the drive. In this respect, the spring of the spring apparatus, which in the present case merely acts as a passive component, is used as a basis for receiving the base load which acts on the device according to the invention as a mass. In this respect, when the device according to the invention is first used, a load of a predetermined force is raised to a predetermined distance level between the lower and upper suspension faces. The available force of the drive can now be produced in both directions of the operating direction of the spring apparatus by way of the drive in the form of a rotary field magnet. During the operation of the device according to the invention, this force of the drive is used to correct temporary distance deviations between the lower and upper suspension faces, in such a way that as a result of the device according to the invention the predetermined distance between the lower and upper suspension face is permanently aimed for and merely minimal deviation therefrom occurs.

In this respect, it has been found to be advantageous for at least one movement sensor to be provided, by means of which the movements of the upper suspension part with respect to the lower suspension part in the at least one spatial direction can be detected. The data detected by the movement sensor can preferably be passed on to the control apparatus. As a result of this movement sensor, which may be formed as a path sensor or angle sensor, the dynamics, in other words the movement of the lower suspension face with respect to the upper suspension face, are detected and passed on to the control apparatus. In this respect, the measurement range corresponds to the total stroke of the spring apparatus. During active control of the device according to the invention, the entire force spectrum of the drive or of the rotary field magnet, respectively is made use of so as to influence introductions of force into the device according to the invention.

The device according to the invention can thus both act together with the introduction of force, in other words the supporting force for the upper suspension side to carry a mass is reduced, and counter the introduction of force, in which case the force counter to the introduction of force is increased.

The high-frequency control which is required for influencing the oscillations is provided in this respect by way of the changes in the supplied current or in the direction of rotation of the drive or the rotary field magnet, respectively. In this respect, the type and intensity of the control is stored in a control algorithm of the control apparatus. The type and intensity of the force introduction are detected by the device according to the invention by way of the acceleration reader, which is fixed to the lower suspension part, and the movement sensor, which evaluates the distance or the deviation thereof, respectively between the upper suspension part and the lower suspension part.

In accordance with a further inventive idea, a shock absorber is provided for damping oscillations of the spring apparatus.

The invention also further relates to a seat, in particular a vehicle seat, comprising an above-described device according to the invention, and also to a vehicle comprising at least one seat of this type or respectively comprising at least one above-described device according to the invention.

Further aims, advantages, features and possible applications of the present invention may be seen from the following description of embodiments by way of the drawings. In this respect, all of the features which are described and/or shown in the drawings, in isolation or in any reasonable combination, form the subject matter of the present invention, irrespective of how they are compiled in the claims or the dependencies thereof.

BRIEF DESCRIPTION OF THE DRAWINGS

FIGS. 1 to 6c are various views of an embodiment of a device according to the invention, which is used in a vehicle seat for damping oscillations during the operation of the vehicle.

DETAILED DESCRIPTION

In this respect, the device comprises an upper suspension face 1 and a lower suspension face 2, between which a spring means 3 is arranged. In the present case, the spring means 3 consists of a scissor-type support apparatus 6 and of a spring 5 in the form of an air spring, by means of which movements in a vertical direction Z can be damped. In this respect the scissor-type support apparatus 6 consists of a first scissors 10 and a second scissors 13. The first scissors 10 consists of a first inner link 7 and a first outer link 8, these being interconnected so as to be pivotable with respect to one another approximately in the centres thereof. The second scissors 13 consists of a second inner link 11 and a second outer link 12, which are likewise interconnected so as to be pivotable with respect to one another approximately in the centres thereof. The lower ends of the first inner link 7 and the second inner link 11 are arranged on a floating bearing transverse connection 24, which is mounted in fixed bearings 25 arranged fixedly on the lower suspension face 2. At the upper ends thereof, the first inner link 7 and the second inner link 11 are interconnected by means of an additional floating bearing transverse connection 31, at the ends of which there are rollers 32 which are guided in guide rails 26 and 28 arranged on the upper vehicle face.

Analogously, at the upper ends thereof, the first outer link 8 and the second outer link 12 are mounted in fixed bearings 25' arranged on the upper suspension face by means of a floating bearing transverse connection 24'. At the lower ends thereof, the first outer link 8 and the second outer link 12 are interconnected via a further floating bearing transverse connection 30, rollers 33, which are guided in guide rails 27 and 29 arranged on the lower suspension face 2, being arranged at the ends of the floating bearing transverse connection 30.

By means of the entire spring apparatus 6, in this respect the distance between the upper suspension face 1 and the lower suspension face 2 can be varied by force input, for example if a force is applied to the device arranged in a vehicle seat by a person sitting down on the vehicle seat.

Since during operation of the device in a vehicle seat oscillations due to irregularities in the road surface on which the vehicle is moving or due to displacement of the weight of the person sitting on the seat vary the force introduced to the device according to the invention during operation of the vehicle, an actuating element 4, by means of which the externally introduced force input into the device can be countered, is provided for compensating this force input.

In the present embodiment, the actuating element 4 consists of a drive 23 in the form of a rotary field magnet 14, by means of which a coupling rod 16 in the form of a recirculating ball screw 15 can be moved back and forth. For this purpose, the recirculating ball screw 15 comprises, on the circumference thereof, a screw having a screw pitch of approximately 45°. The drive 23 in the form of a rotary field magnet 14 is arranged fixedly on the lower suspension face 2, whilst the coupling rod 16 is arranged on the floating bearing transverse connection 30 via a fixing element 22.

To make it possible to detect movements and accelerations of the upper suspension face 1 with respect to the lower suspension face 2, a movement sensor 19, in this case in the form of an angle sensor, and an acceleration sensor 20 are provided. By means of these sensors 19 and 20, the intensity of the introduction of force and the distance or deviations, respectively from a predetermined distance between the upper suspension part 1 and the lower suspension part 2 can be established. In this respect, the data detected by the sensors 19 and 20 can be passed on to a control apparatus (not shown here), which supplies the drive 23 or the rotary field magnet 14 with current and voltage on the basis of the data supplied by the sensors 19 and 20, in such a way that an introduction of force can be countered or promoted, in such a way that the entire system is always urged to take on the predetermined zero position thereof.

Figure 1:
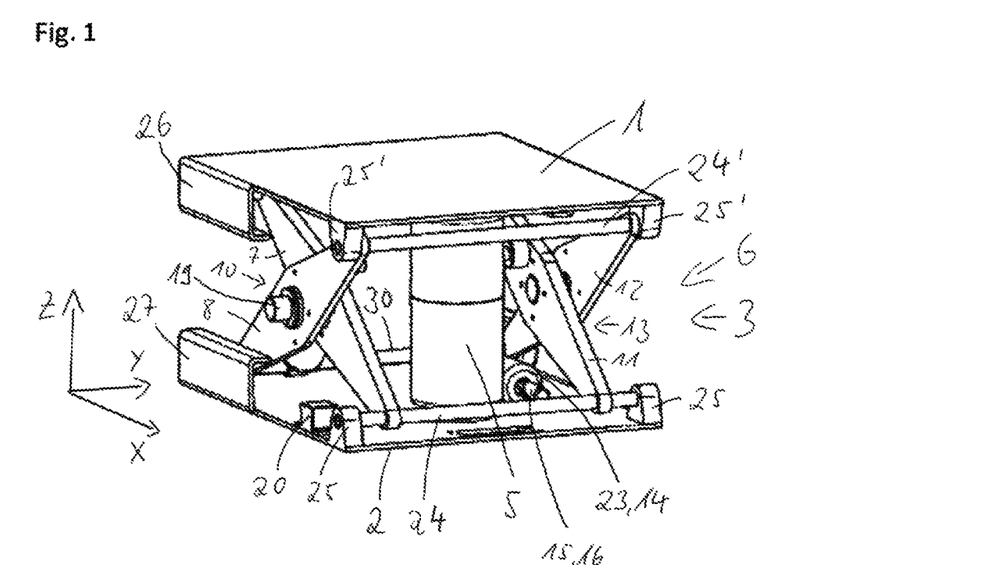
FIG. 1 is a perspective view of an embodiment of a device according to the invention.
Figure 2:
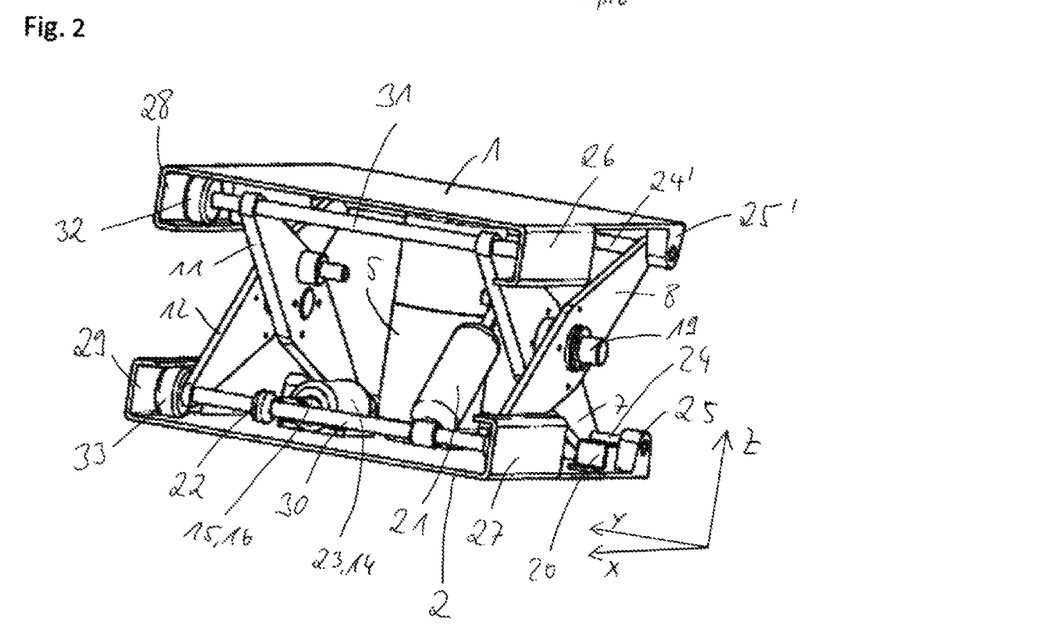
FIG. 2 is a different perspective view of the device according to the invention in accordance with FIG. 1.
Figure 3:
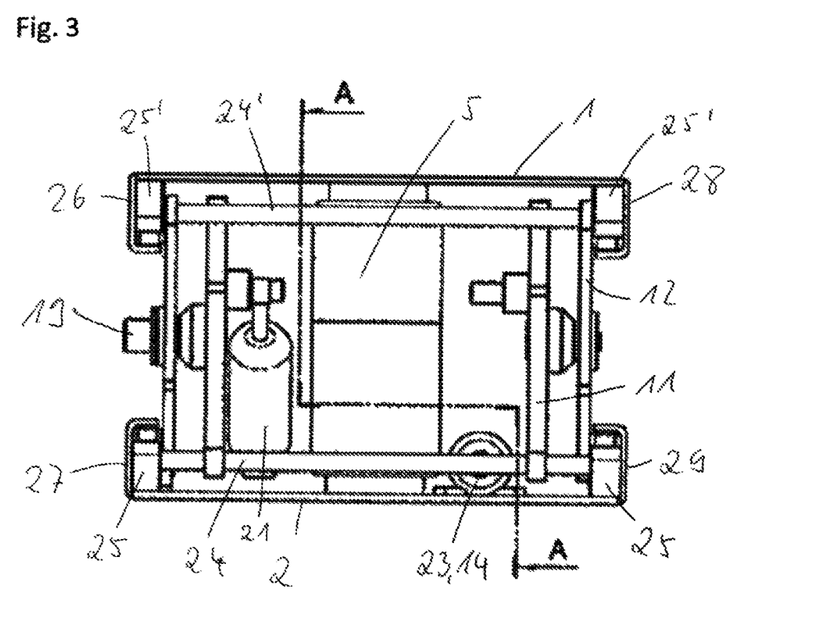
FIG. 3 is a front view of the device in accordance with FIGS. 1 and 2.
Figure 4:
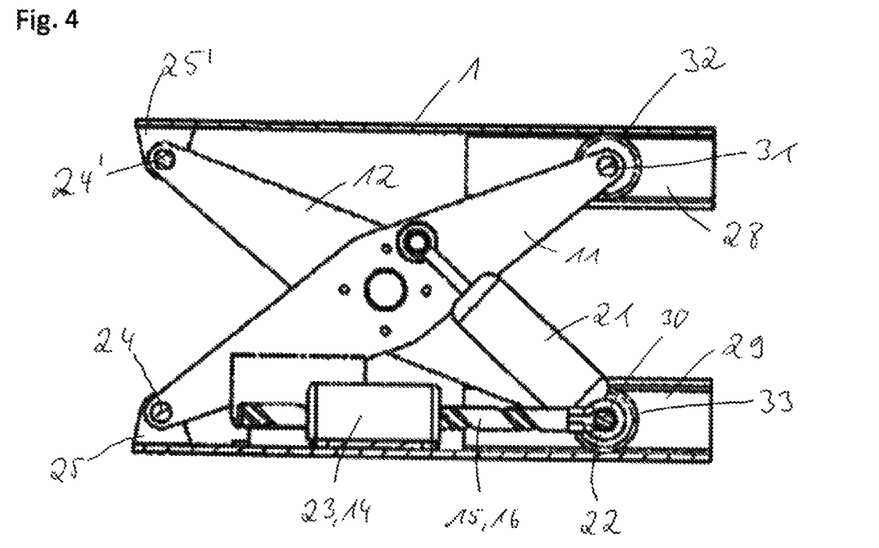
FIG. 4 is a section along line A-A from FIG. 3 of the device according to the invention from FIG. 3.
Figure 5:
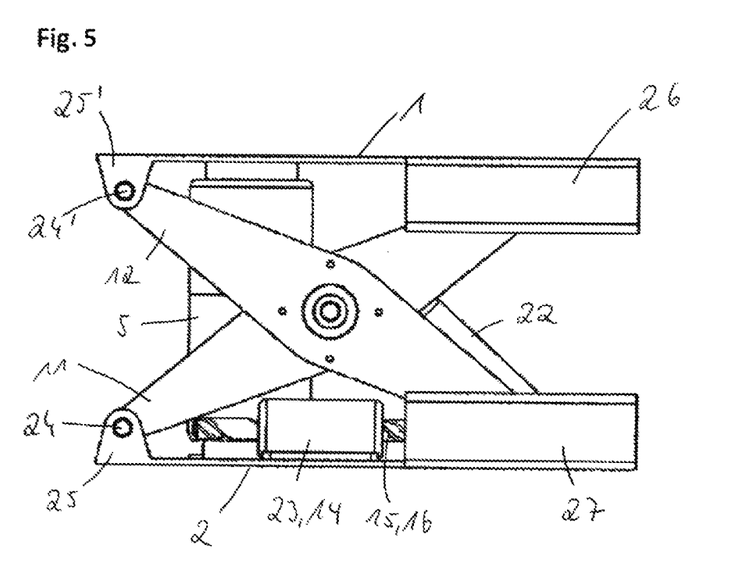
FIG. 5 is a side view of the device according to the invention in accordance with FIGS. 1 to 4, FIGS. 6a to 6c show the device according to the invention of FIGS. 1 to 5 in different loading states.
Figure 6A:
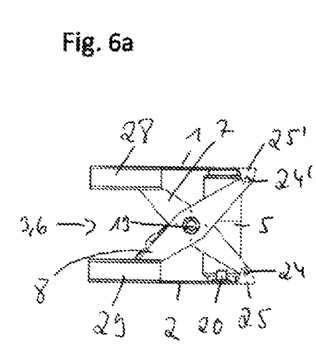
Figure 6B:
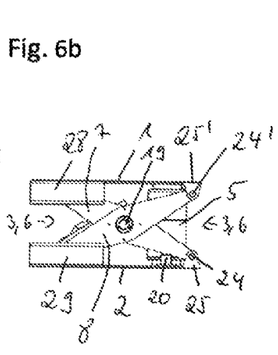
Figure 6C:
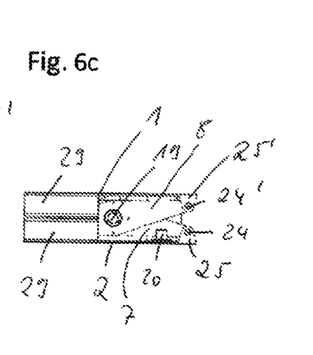

A zero position of this type is shown for example in FIG. 6b, whilst FIG. 6a shows the maximum deflection of the entire system in the positive Z or vertical direction and FIG. 6c shows the maximum deflection of the entire system in the negative Z or vertical direction, respectively.

To damp the oscillation introduced into the device according to the invention by the spring apparatus 3 after a force is applied, a shock absorber 21 is provided, one end of which is likewise arranged on the floating bearing transverse connection 30, whilst the other end thereof is arranged in the upper region of the first inner link 7 of the first scissors.

Figure 7:
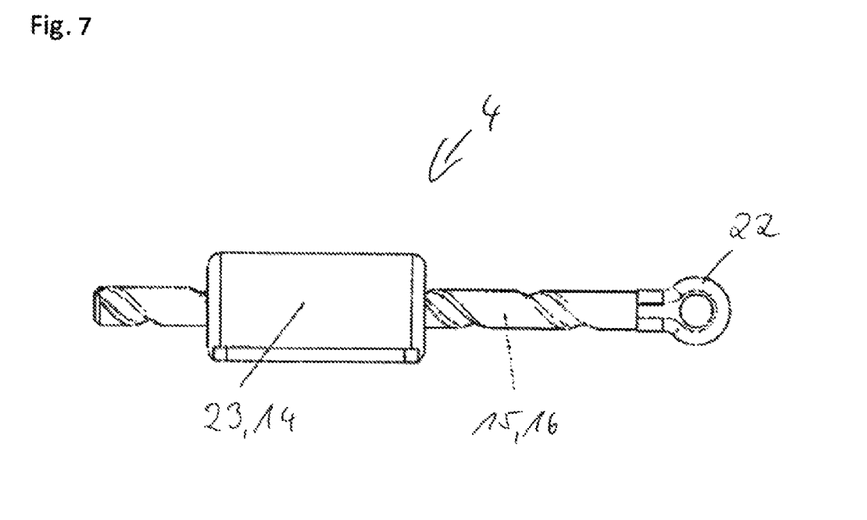
FIG. 7 shows an embodiment of an actuating element of a device according to the invention.
Figure 8:
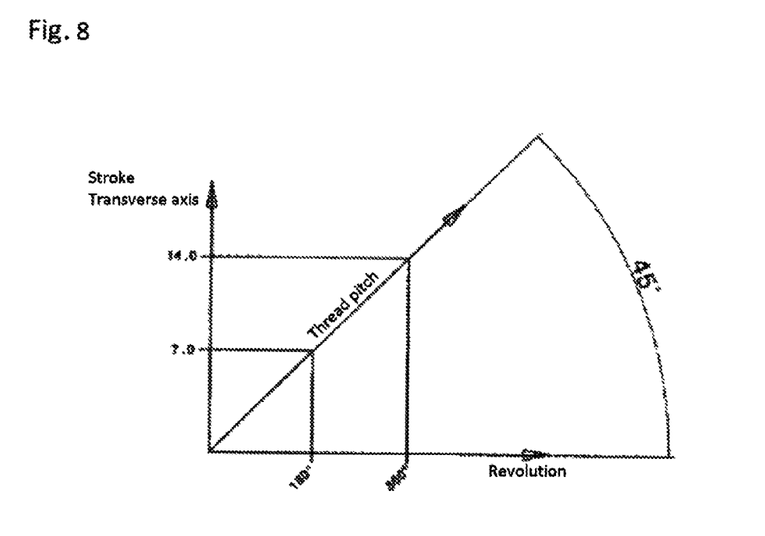
FIG. 8 shows the stroke of the coupling rod in accordance with FIG. 7 in relation to the revolutions thereof.

FIG. 7 shows a possible embodiment of an actuating element 4. In this respect, the actuating element 4 consists of the drive 23 in the form of a rotary field magnet 14, by means of which the coupling rod 16 in the form of a recirculating ball screw 15 can be moved back and forth. In the present embodiment, the screw pitch of the recirculating ball screw 15 is approximately 45°, it being possible to produce a stroke of 7 cm when rotating the recirculating ball screw by 180° and a stroke of 14 cm when rotating the recirculating ball screw by 360°. FIG. 8 is a graph of this stroke/revolution ratio.

Figure 9:
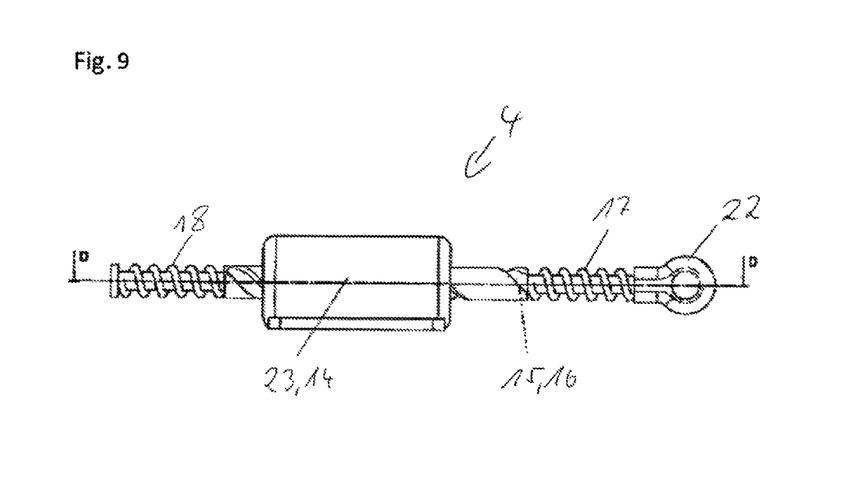
FIG. 9 shows a further embodiment of an actuating element of a device according to the invention.

FIG. 9, however, shows a further embodiment of a possible actuating element 4 for a device according to the invention. In contrast with the actuating element 4 from FIG. 7, in this respect, the coupling rod 16 in the form of a recirculating ball screw 15 comprises two spring elements 17 and 18. These spring elements 17 and 18 ensure that they are initially biased when a force is introduced into the device according to the invention and that subsequently the rotational movement of the coupling rod 16 in the form of a recirculating ball screw 15 is introduced. As a result of this coupling by means of the spring elements 17 and 18, permanent entrainment of the drive 23 in the form of a rotary field magnet 14 in rotation can be prevented, in particular in the high-frequency or short-stroke operating range, respectively of the device according to the invention. The spring characteristic of the spring elements 17 and 18 are superposed with the spring characteristic 42 of the spring 5. In this respect, the usable field of forces consists of the spring rate of the spring 5, the spring rate of the spring elements 17 and 18 and the force spectrum of the drive 23 in form of a rotary field magnet 14.

Figure 10:
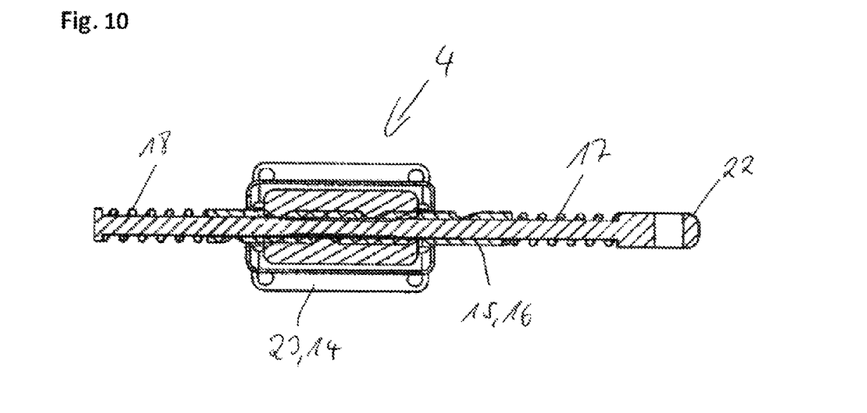
FIG. 10 is a section along line D-D through the actuating element in accordance with FIG. 9.
Figure 11:
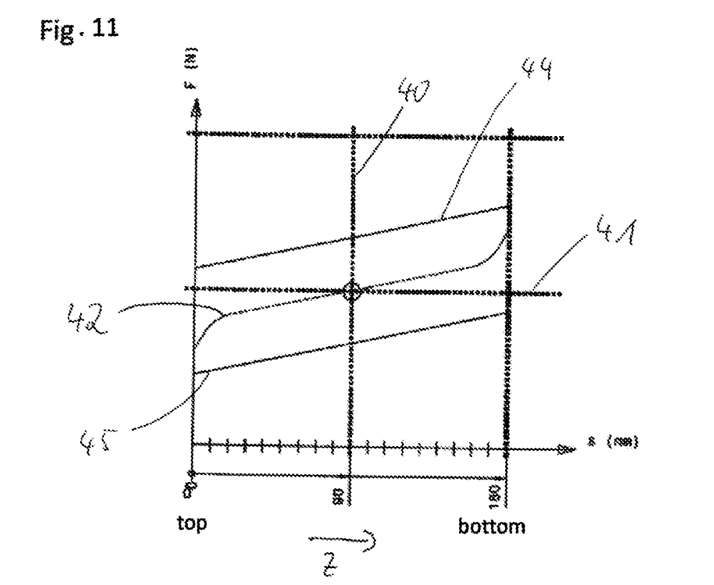
FIG. 11 is a force-deflection graph for a device according to the invention.
Figure 12:
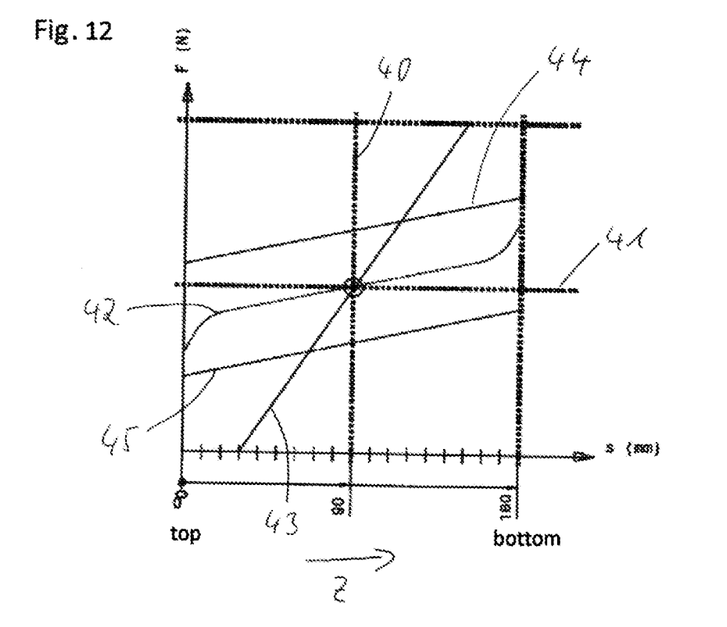
FIG. 12 is a further force-deflection graph for another device according to the invention.

FIG. 11 is a corresponding force-deflection diagram for the actuating element 4 in accordance with FIG. 7, while FIG. 12 is a corresponding force-deflection diagram of the actuating element 4 from FIGS. 9 and 10.

As already mentioned, in this respect, reference numeral 43 denotes the spring characteristic of the springs 17 and 18 and reference numeral 42 denotes the spring characteristic of the spring 5. Further, a target level line 40 is shown in the graphs, and which is taken on by the device according to the invention when a predetermined weight or a predetermined force, respectively is applied thereto. For example, the deflection of the upper suspension part 1 or the change in distance, respectively between the upper suspension part 1 and the lower suspension part 2 is approximately 90 mm for an applied force of 1000 N.

In this respect, in the present embodiment, FIG. 6b shows the deflection of 90 mm, whilst FIG. 6a shows a deflection of 0 mm and FIG. 6c shows a deflection of 180 mm. In the two force-deflection diagrams of FIGS. 11 and 12, reference numeral 41 indicates a target force line, to represent the force of 1000 N. The target force line 41 and the target level line 40 intersect at an intersection point, through which the spring characteristics 42 of the spring 5 and the spring characteristic 43 of the spring elements 17 and 18 also pass. In this respect, reference numerals 44 and 45 indicate an upper force line and a lower force line. In this respect the upper force line 44 denotes the force which can be introduced by the actuating element 4 in addition to the force acting on the device, whilst the lower force line 45 indicates a force which counters the force introduced into the device. In the present embodiment, this force to be additionally introduced is approximately 200 N.

Thus, by means of the device according to the invention, in particular as shown in FIGS. 1 to 5, an actuating element 4 in accordance with FIG. 7 or in accordance with FIGS. 9 and 10, respectively being installed, the deviation of the upper suspension face 4 from the target level line 7 can be minimised during the operation of the device according to the invention, in such a way that a vehicle seat equipped therewith substantially maintains the position thereof about this target level line 9, with optimum suspension comfort and damping comfort.

LIST OF REFERENCE NUMERALS

1 Upper suspension part
2 Lower suspension part
3 Spring means
4 Actuating element
5 Spring
6 Scissor-type support apparatus
7 First inner link
8 First outer link
10 First scissors
11 Second inner link
12 Second outer link
13 Second scissors
14 Rotary field magnet
15 Recirculating ball screw
16 Coupling rod
17 Spring element
18 Spring element
19 Movement sensor
20 Acceleration sensor
21 Shock absorber
22 Fixing element
23 Drive
24 Floating bearing transverse connection
24' Floating bearing transverse connection
25 Fixed bearing
25' Fixed bearing
26 Guide rail
27 Guide rail
28 Guide rail
29 Guide rail
30 Floating bearing transverse connection
31 Floating bearing transverse connection
32 Roller
33 Roller
40 Target level line
41 Target force line
42 Spring characteristic of the spring 5
43 Spring characteristics of the springs 17 and 18
44 Upper force line
45 Lower force line
X Longitudinal direction
Y Width direction
Z Vertical direction

What is claimed is:

1. A device for damping an upper suspension part in at least one spatial direction (X, Y, Z) with respect to a lower suspension part movable relative thereto, comprising:
    a spring apparatus which acts along an operating direction between the upper suspension part and the lower suspension part being provided for damping, wherein an actuating element is provided by way of which a force can be introduced into the device bidirectionally along the operating direction of the spring apparatus, the actuating element comprising a drive, a coupling rod coupled to the drive, and at least one spring element on the coupling rod, the actuating element being actuable via a control apparatus,
    wherein an operating direction of the coupling rod is perpendicular to the operating direction of the spring apparatus,
    wherein the coupling rod is connected to a floating bearing transverse connection,
    wherein an angle sensor and an acceleration sensor are provided to detect movements of the upper suspension part with respect to the lower suspension part in the at least one spatial direction and to detect accelerations between the upper suspension part and the lower suspension part, and to send the detected movements and the detected accelerations to the control apparatus, and
    wherein the control apparatus controls the actuating element, based on the detected movements and the detected accelerations and via the drive, the coupling rod and the at least one spring element, such that a location of the floating bearing transverse connection within a guide rail is controlled to maintain a desired position of the upper suspension part relative to the lower suspension part.

2. The device according to claim 1, wherein the drive is a rotary field magnet, and the coupling rod is a recirculating ball screw.

3. The device according to claim 1, wherein the spring apparatus comprises a spring, which is arranged between the upper suspension part and the lower suspension part, and a scissor-type support apparatus, which connects the upper suspension part to the lower suspension part such that they are movable relative to one another.

4. The device according to claim 3, wherein the scissor-type support apparatus comprises a first scissors, consisting of a first inner link and a first outer link, and a second scissors, consisting of a second inner link and a second outer link, which are interconnected via at least the floating bearing transverse connection.

5. The device according to claim 4, wherein the drive is fixedly arranged on the upper suspension part or the lower suspension part.

6. The device according to claim 4, wherein the coupling rod is a spring-loaded coupling rod having the at least one spring element.

7. The device according to claim 1, wherein at least one movement sensor is provided to detect the movements of the upper suspension part with respect to the lower suspension part in the at least one spatial direction (X, Y, Z), and to send the detected movements to the control apparatus.

8. The device according to claim 1, wherein a shock absorber is provided for damping oscillations of the spring apparatus.

9. A vehicle seat, comprising the device according to claim 1.

10. A vehicle comprising the vehicle seat according to claim 9.

11. The device according to claim 1, wherein the coupling rod is drivable by the drive and by the spring apparatus.

12. The device according to claim 1, wherein a force introduced by the actuating element acts together with an external force acting on the device so that a supporting force for the upper suspension side to carry a mass is reduced, or wherein the force, introduced by the actuating element counters an external force acting on the device so that the supporting force for the upper suspension side to carry the mass is increased.

13. The device according to claim 12, wherein a bidirectional introduction of the force is controlled actively by the control apparatus, wherein a levelling in the event of temporary deviations in the distance between the lower and upper suspension part is controlled actively so that an active engagement in isolating oscillations takes place.

14. The device according to claim 13, wherein the type and the intensity of the active engagement in isolating oscillations is determined by a control algorithm of the control apparatus, wherein the force to introduce by the actuating element is determined by the control algorithm based on the acceleration of the upper suspension part relative to the lower suspension part and the distance or the deviation thereof between the upper suspension part and the lower suspension part, respectively.

15. The device according to claim 1, wherein the at least one spring element is a first spring element fitted over a first end of the coupling rod and a second spring element fitted over a second end of the coupling rod, and wherein the first spring element and the second spring element are initially biased to spring-load the coupling rod.

16. The device according to claim 15, wherein the drive is fixed to the lower suspension part, and wherein the drive is coupled to the coupling rod between the first spring element and the second spring element.

17. A device for damping an upper suspension part in at least one spatial direction (X, Y, Z) with respect to a lower suspension part movable relative thereto, comprising:
    a spring apparatus, which acts along an operating direction between the upper suspension part and the lower suspension part being provided for damping, wherein an actuating element is provided by way of which a force is introduced into the device bidirectionally along said operating direction of the spring apparatus, the actuating element comprising a drive, a coupling rod coupled to the drive, and at least one spring element on the coupling rod, the actuating element being actuable via a control apparatus,
    wherein an operating direction of the coupling rod is perpendicular to the operating direction of the spring apparatus,
    wherein the drive is connected to a floating bearing transverse connection and the coupling rod and is fixedly arranged on the upper suspension part or lower suspension part,
    wherein an angle sensor and an acceleration sensor are provided to detect movements of the upper suspension part with respect to the lower suspension part in the at least one spatial direction and to detect accelerations between the upper suspension part and the lower suspension part, and to send the detected movements and the detected accelerations to the control apparatus, and
    wherein the control apparatus controls the actuating element, based on the detected movements and the detected accelerations and via the drive, the coupling rod and the at least one spring element, such that a location of the floating bearing transverse connection within a guide rail is controlled to maintain a desired position of the upper suspension part relative to the lower suspension part.

18. A vehicle seat comprising the device according to claim 17.

19. A vehicle comprising the vehicle seat of claim 18.

20. A device for damping an upper suspension part in at least one spatial direction (X, Y, Z) with respect to a lower suspension part movable relative thereto, comprising:
    a spring apparatus which acts along an operating direction between the upper suspension part and the lower suspension part being provided for damping, wherein an actuating element is provided by way of which a force can be introduced into the device bidirectionally along the operating direction of the spring apparatus, the actuating element comprising a drive, a coupling rod coupled to the drive, and at least one spring element on the coupling rod, the actuating element being actuable via a control apparatus,
    wherein an operating direction of the coupling rod is perpendicular to the operating direction of the spring apparatus,
    wherein the coupling rod is connected to a floating bearing transverse connection, and
    wherein the control apparatus controls the actuating element, via the coupling rod and the at least one spring element, such that a location of the floating bearing transverse connection within a guide rail is controlled to maintain a desired position of the upper suspension part relative to the lower suspension part.

21. The device according to claim 20, wherein the at least one spring element is a first spring element fitted over a first end of the coupling rod and a second spring element fitted over a second end of the coupling rod, and wherein the first spring element and the second spring element are initially biased to spring-load the coupling rod.

22. The device according to claim 21, wherein the drive is fixed to the lower suspension part, and wherein the drive is coupled to the coupling rod between the first spring element and the second spring element.

23. The device according to claim 20, wherein the drive is a rotary field magnet, and the coupling rod is a recirculating ball screw,
    wherein the spring apparatus comprises a spring, which is arranged between the upper suspension part and the lower suspension part, and a scissor-type support apparatus, which connects the upper suspension part to the lower suspension part such that they are movable relative to one another, and
    wherein the scissor-type support apparatus comprises a first scissors, consisting of a first inner link and a first outer link, and a second scissors, consisting of a second inner link and a second outer link, which are interconnected via at least the floating bearing transverse connection.

* * * * *